Dec. 31, 1968  A. H. BRIDGE, JR  3,419,059
REINFORCEMENT ELEMENT
Filed May 4, 1965

BEFORE TWIST

AFTER TWIST

VECTOR RELATIONSHIP

INVENTOR.
ARNOLD H. BRIDGE, JR.
BY
J.B. Holden
ATTORNEY

United States Patent Office 3,419,059
Patented Dec. 31, 1968

3,419,059
REINFORCEMENT ELEMENT
Arnold H. Bridge, Jr., Cuyahoga Falls, Ohio, assignor to The Goodyear Tire & Rubber Company, Akron, Ohio, a corporation of Ohio
Filed May 4, 1965, Ser. No. 453,056
8 Claims. (Cl. 152—359)

ABSTRACT OF THE DISCLOSURE

An improved elastomer reinforcing cord structure and method for making the same provide a plurality of continuous multifilament yarns of different physical properties so twisted together helically about one another in the cord as to have equal effective moduli, defined as load at a predetermined elongation, particularly in the elongation range experienced in reinforcing an elastomeric article such as a tire in its normal use.

---

This invention relates to pneumatic tires and more particularly to the reinforcement material positioned within the elastomeric carcass to withstand the loads resulting from use on motor vehicles.

The vehicular tire of today must withstand more severe service conditions than ever before. To keep pace with the demand for increased performance, there has been a gradual shift away from the utilization of reinforcement fibers such as cotton and even rayon. In their place have been substituted higher performance synthetic materials including nylon and various polyesters. The synthetic reinforcement filaments are utilized in cords, or yarn, form and are strategically located within the tire carcass in the conventional manner. Although the synthetic materials are superior in many respects to formerly employed fibers such as cotton and rayon, they possess inherent disadvantages such as poor dimensional stability, creep, growth, and flat-spotting in the completed tire.

The present invention contemplates a tire construction in which the reinforcement material contained therein possesses a desirable balance of properties which will produce improved durability and esthetic characteristics such as ride.

It is the principal object of the present invention to provide a composite reinforcement material that combines the desirable physical properties of each individual component.

It is another object of the present invention to combine a plurality of dissimilar yarns so that they effectively work as a unit.

A further object of the present invention is to provide a method of determining the optimum cord construction utilizing a plurality of different materials.

An additional object of the invention is to provide a pneumatic tire having superior flat-spotting characteristics.

There have been many attempts to combine two or more dissimilar reinforcement materials into a single composite load carrying unit. The invention herein sets forth a selected method of combining the materials so that both may work in unison according to their respective physical properties.

Other objects and features of the advantages of the present invention will be found throughout the following description of the invention, particularly when considered with the accompanying drawings in which like reference characters and symbols refer to similar elements.

Figure 1:
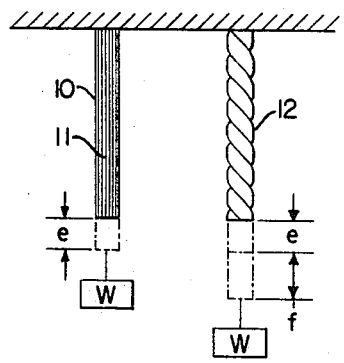
FIG. 1 is a schematic showing the relative elongation of a twisted and non-twisted yarn.

FIG. 1 shows a yarn 10 comprised of untwisted filaments 11 all arranged parallel with one another. When weight $w$ is applied the yarn elongates and assumes a new length that differs from the original length by $e$. It is realized that the load-elongation curves of most reinforcement materials are essentially "non-Hookean"; however, at low elongation in the range near 3% the curves are nearly linear. When the same cord is of twisted construction, as shown at 12, having one or more yarns or groups of filaments, the overall elongation is a combination of $e$ and $f$. The additional elongation $f$ results from the twist that has been introduced in the reinforcement yarn.

In order to successfully combine yarns of different physical properties, particularly those having different rates of extensibility, it can be seen from FIG. 1 that different amounts of twist will have to be imparted to the individual yarns that make up the cord so that the entire structure will be equally stressed when subjected to a given load. It is also readily apparent that the extra elongation in a given reinforcement cord containing twist is dependent upon the denier of the cord, or yarn, and the amount of yarn twist and cable twist per unit length.

Figure 2A:
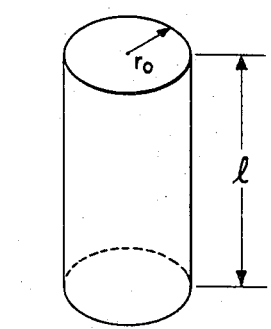
FIG. 2A is a pictorial representation of a yarn of given axial extent.
Figure 2B:
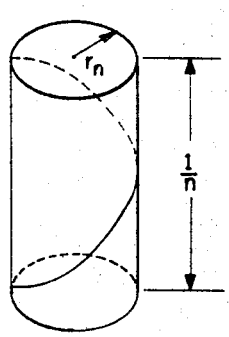
FIG. 2B is similar to FIG. 2A except that the yarn has been twisted.

The following theory is set forth to show how the optimum values of twist can be attained. The filaments in a yarn form a given spiral as they progress in an axial direction along the yarn. FIG. 2A shows a yarn before any twist has been incorporated therein. FIG. 2B shows a given length of yarn after it has been subjected to a given twist. For convenience and clarity a vector diagram has been shown in FIG. 2C.

Figure 2C:
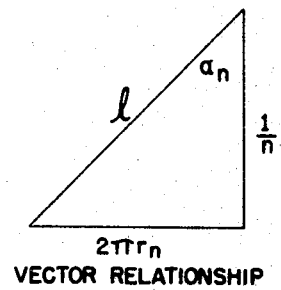
FIG. 2C is a diagram showing the geometrical relationship of the twisted yarn of FIG. 2B.

From the geometry shown in FIG. 2C is can be determined that;

$$\tan \alpha_n = 2\pi n r_n$$

where $\alpha_n$ = angle of filament with yarn axis
$n$ = turn per inch twist
$r_n$ = radius of yarn in inches after twist Heretofore work has been done to show the relationship between the various moduli of filamentary structures.

The relationship between the modulus of the twisted yarn or structure and the modulus of the original untwisted yarn or structure can be expressed in the following form as shown by Equation 16 in The Journal of the Textile Institute, vol. 55, (1964).

$$\frac{(E_y)_n}{(E_r)_o} = 2[(1+\sigma_y) \cos \alpha_n - \sigma_y] \cot^2 \alpha_n \, ln \, \sec \alpha_n$$

where $(E_y)_n$ = modulus of twisted yarn
$(E_r)_o$ = modulus of untwisted yarn
$\sigma_y$ = Poisson's ratio The inherent disadvantage of equations of the prior art such as shown above is that $\alpha$ must be evaluated before useful ratios can be ascertained. When one considers the small diameter of a typical reinforcement cord it readily becomes apparent that it is exceedingly difficult to accurately measure the angle which the twisted yarn makes with respect to its longitudinal axis.

In order to rapidly determine what the proper amount of twist is for a given combination of different materials the following theory has been evolved. Since denier is the weight in grams of 9000 meters of a given filament or yarn, the following relationship exists.

$$A_o = \frac{D_o}{\rho} \quad (2)$$

where $A_o$=cross sectional area at zero twist and is expressed in square inches.
$k$=a proportionality constant dependent solely on dimensions chosen for $D_o$ and $\rho$.
$D_o$=denier at zero twist expressed as gm./9000 m.
$\rho$=density of yarn in gm./cm.$^3$ The above expression is even more evident when one considers that the weight of one length of yarn 9000 meters long can be expressed as $$Wt = A_o \times 1 \times \rho$$

$A_o$ can be evaluated in the following manner;

$$A_o = \frac{\frac{D_o \text{ gm.}}{9000 \text{ m.}}}{\frac{\rho \text{ gm.}}{\text{cm.}^3}} = \frac{D_o}{(2.54)^2 \times 90 \times 10^4 \rho}$$

$$A_o = \frac{1.72 D_o \times 10^{-7}}{\rho}$$

Since $A_o = \pi r_o^2$ the following substitution can be made; where
$r_o$=radius of yarn at zero twist $$r_o^2 = \frac{1.72 D_o \times 10^{-7}}{\pi \rho}$$

$$r_o = \left[\frac{5.49 D_o \times 10^{-8}}{\rho}\right]^{1/2} = \left[5.49 \frac{D_o}{\rho}\right]^{1/2} \times 10^{-4} \quad (3)$$

Equation 1 shows that tan $\alpha_n$ is equal to an expression containing $r_n$. An equivalent expression containing $r_o$ can be stated as follows:

$$N_T = 2\pi n r_o$$

solving for $r_o$ then;

$$r_o = \frac{N_T}{2\pi n} \quad (4)$$

Equations 3 and 4 may be equated.

$$\frac{N_T}{2\pi n} = \left[5.49 \frac{D_o}{\rho}\right]^{1/2} \times 10^{-4}$$

$$N_T = n \left[2.16 \frac{D_o}{\rho}\right]^{1/2} \times 10^{-3} \quad (5)$$

Thus it becomes apparent that $N_T$ can be used more conveniently than tan $\alpha_n$. The denier and density of a given yarn can be more accurately determined than the angle of twist.

For example a yarn of polyester tire cord was used in the following table. The yarn had a denier of 840 and a density of 1.36. Table 1 below shows the values obtained for the above yarn at 3% elongation.

TABLE 1

| No turns twist | $N_T$ | $(E_y)_n$ | $(E_y)_n/(E_y)_o$ |
|---|---|---|---|
| 0 | 0 | 4.36 | 1.00 |
| 3 | 0.11 | 4.21 | 0.97 |
| 6 | 0.22 | 3.91 | 0.90 |
| 8 | 0.29 | 3.40 | 0.78 |
| 9 | 0.33 | 3.04 | 0.70 |
| 10 | 0.36 | 2.68 | 0.62 |
| 12 | 0.44 | 2.17 | 0.50 |
| 15 | 0.55 | 1.48 | 0.34 |
| 18 | 0.66 | 1.18 | 0.27 |

The $(E_y)_n$ was determined by placing test specimens in a tensile test machine. The $(E_y)_n/(E_y)_o$ ratio for 3 turns per inch as shown on line 2 in Table 1 is calculated in the following manner;

$$\frac{(E_y)_n}{(E_y)_o} = \frac{4.21}{4.36} = 0.97$$

Figure 3:
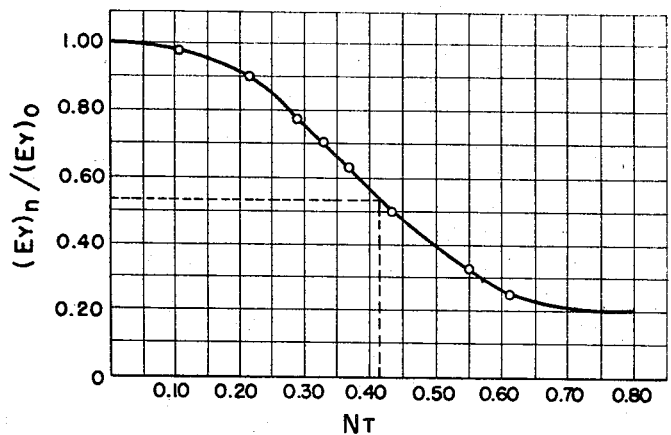
FIG. 3 is a graph showing a curve approximating a probability curve useful in determining the twist in a yarn.

The graph of FIG. 3 shows only one material thereon. This has been done in order to simplify the matter. When different materials such as nylon and rayon are plotted in conjunction with Vytacord several curves all having the same general configuration and all in close proximity with each other will result.

If desired the graph as shown in FIG. 3 can be stated in the form of an equation. Its general configuration is similar to the general probability curve of:

$$y = e^{-x^2} \quad (6)$$

The parameter of curves stated above for different materials can be covered by ascertaining the slope of the curves when plotted on semi-log graph paper and modifying Equation 7 as follows:

$$y = \frac{(E_y)_n}{(E_y)_o} = e^{-c\left[n\left(2.16\frac{D_o}{\rho}\right)^{1/2} \times 10^{-3}\right]^2} \quad (7)$$

It has been found that $c$ in Equation 7 can vary between 2.0 and 4.0 and still produce the desired results. The curve of FIGURE 3, and the data of Table 1 show $c$ having a value of 3.03.

The graph of FIG. 3 or its corresponding Equation 7 can serve as the basis for the proper selection of deniers, ply twist and cable twist for optimum merged fiber properties.

The selection of the proper yarn or cord twist is based upon the following assumptions for the purposes of calculating twist;

(1) The stress-strain properties of a single ply will be the same after incorporation in a cord as in the yarn.
(2) The tensile modulus of the cord must be in the area of a simultaneous break and this can occur only when the modulus of individual plies are similar.
(3) Since the optimum ply twist present in a cord of the same fiber is zero, the residual twist of the lower modulus fiber in a merged cord will always be chosen as zero.

An example of how the above theory can be used to merge two different yarns into a composite cord having balanced moduli is set forth in Example 1.

*Example 1*

It is desired to merge a nylon 1260 denier yarn having a density of 1.14 gm./cm.$^3$ and a 1100 denier rayon yarn having a density of 1.52 gm./cm.$^3$. The 3% modulus at zero twist is as follows:

$(E_y)_o$ nylon=3.0; $(E_y)_o$ rayon=5.6. In accordance with assumption 3, above, $(E_y)_n$ of the rayon is equal to $(E_y)_o$ of the nylon (the yarn of lowest modulus). The relative modulus, $(E_y)_n/(E_y)_o$, for the rayon (the higher modulus yarn) then is 3.0/5.6=0.54. Going to FIG. 3 and entering the ordinate at 0.54 it can be seen that $N_T$ is 0.42. Using Equation 5

$$0.42 = n\left[2.16\frac{D_o}{\rho}\right]^{1/2} \times 10^{-3}$$

$$n = \frac{0.42}{\left[2.16 \times \frac{1100}{1.52}\right]^{1/2} \times 10^{-3}}$$

$$n = 11.6$$

This means that in a twisted cord for example of 10 turns per inch, the nylon yarn will have zero twist and that the rayon yarn will have a twist of 11.6 turns per inch.

Figure 4:
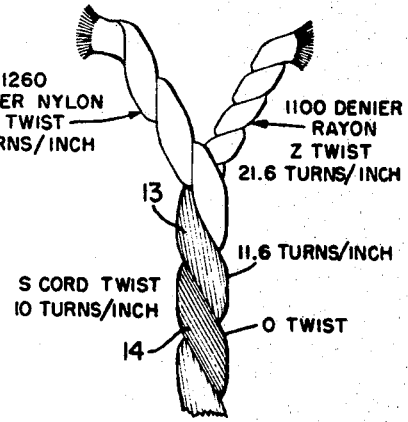
FIG. 4 is a diagram showing the cord structure.

FIG. 4 shows a typical cord using the above determined twist value. Note that the individual filaments 13 of the rayon yarn are not parallel with the direction of the yarn. This is because of the twist remaining in the yarn. At 14 it can be seen that the individual filaments in the nylon yarn are parallel oriented with respect to the direction of the yarn. The parallel orientation results since theoretically all the twist has been taken out of the nylon yarn during the cabling operation.

An additional important aspect of determining the proper amount of twist for the respective yarns of a composite cord reinforcement structure is set forth below. The curve of FIG. 3 as expressed by exponential equation is for moduli in the 3% elongation range. It remains valid for ratios at even higher percentages of elongation; however, as the yarn undergoes higher loads it undergoes a more drastic change in its physical dimensions. The yarn elongates and as it does so its cross-sectional area becomes reduced with respect to its original area. Also, for a given axial length of the twisted yarn the twist is reduced since no new twist is imparted event though there is a substantial increase in length.

Thus it can be ascertained that $N_T$ of Equation 5 must be modified to compensate for the changes that have occurred because of the elongation.

Figure 5:
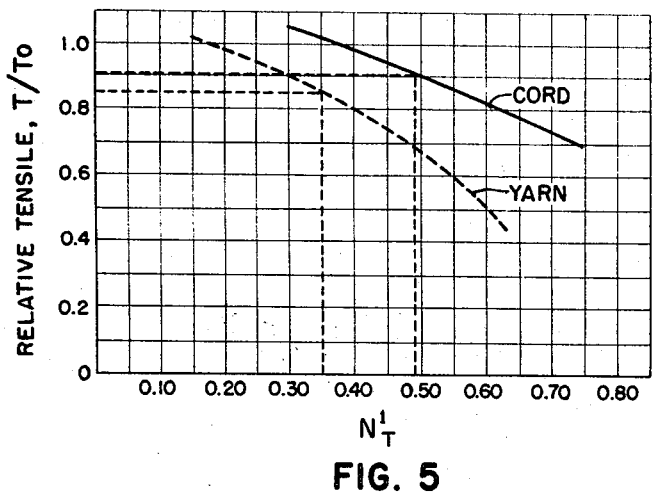
FIG. 5 is a graph showing the tensile strength as a function of the twisted yarn or cord.

FIG. 5 is a graph showing the relationship between $T/T_0$ and $N'_T$ where

T=twisted yarn or cord breaking strength
$T_0$=untwisted yarn or cord breaking strength $$N'_T = N_T \left[ \frac{100 + \beta brk}{100} \right]^{-3/2} \quad (8)$$

The factor that has been applied to $N_T$ compensates for the reduction in denier and twist which are contained in $N_T$.

In order to predict how well a given yarn containing a predetermined twist as calculated in Example 1 will perform under peak loads, the following procedure has been evolved. The example below will serve to illustrate how FIG. 5 is used.

*Example 2*

From Example 1 it can be seen that $N_T=0.42$. It is also known that an 1100 denier rayon yarn will have an elongation in the range of 12%. This would indicate that in the twisted condition both denier ($D_0$) and twist ($n$) would be different from the denier and amount of twist at zero elongation. $N'_T$ is then evaluated $$N'_T = N_T \left[ \frac{100 + \beta brk}{100} \right]^{-3/2}$$

$$= 0.42 \left[ \frac{100 + 0.12}{100} \right]^{-3/2}$$

$$= 0.35$$

Entering the graph of FIG. 5 with an $N'_T$ value of 0.35 and finding the corresponding $T/T_0$ value it can be ascertained what the new breaking strength will be for the yarn of a given twist. If the predicted breaking strength is below that which can be tolerated, then the desired breaking strength can be calculated by picking the value of $T/T_0$, that can be tolerated, from the curve and working back through Equation 8 to determine the new $n$ or number of turns value. In the present example $T/T_0$ is 0.84. Thus T, the breaking strength of the twisted yarn, becomes 10.2 pounds when $T_0$ is 12.2 pounds. The 10.2 pounds for T represents the strength of the 1100 denier rayon yarn that is being merged with the 1260 denier nylon yarn.

An additional important function of FIG. 5 resides in the top curve identified in the drawing as cord. It is an important aid in predicting the ultimate breaking strength in the cord that has been constructed from two different yarns. The following example will best illustrate the use of the top curve of FIG. 5.

*Example 3*

The ultimate tensile strength for a 1260 denier nylon yarn is known from reference sources. In this particular instant the yarn has a breaking strength of 24 pounds and a 16.4 percent elongation at break. The desirable cable twist for the cord is known from experience and is designated as 10 turns per inch herein. The densities of the materials are nylon 1.14 gm./cm.³ and rayon 1.52 gm./cm.³. $N'_T$ (cable) will now be calculated.

$$N'_T \text{ (cable)} = 10 \left[ 2.16 \frac{(1260+1100)}{(.54)(1.14)+(.46)(1.52)} \right]^{1/2}$$

$$\times 10^{-3} \left[ \frac{100+16.4}{100} \right]^{-3/2}$$

$$= 10(3880)^{1/2}[1.164]^{-3/2}$$

$$= 0.49$$

$D_0$ in the equation above is the combined denier of the nylon and rayon yarns. The ratio between the respective deniers is 1260/[1260+1100]. This results in 54% of the cord being nylon and 46% of the cord being rayon. The $\rho$ is a composite density hence the respective densities of the yarns have been taken times the percentage of material present in the cord. From FIG. 5 it can be seen that the above value of $N'_T$ (cable) results in a $T/T_0$ value of 0.90. The original theoretical strength of the cord would be the 24 pounds of the rayon yarn plus the 10.2 pounds for the twisted rayon yarn or 34.2 pounds. Since $T/T_0$ for the cable is 0.90, the predicted cord breaking load would be 34.2 × 0.90, or 30.8 pounds.

By the practice of the present invention it is possible to produce tires of satisfactory strength and durability. The proper selection of the amount of twist in the yarns of a cord permits the cord to reach its ultimate breaking strength without one of the yarns reaching its maximum extensibility and breaking thus causing the remaining yarn or yarns to carry the entire load which can only lead to rupture of all yarns. The following table shows the improvement gained in strength when a cord made from a 60/40 blend of rayon/nylon is varied from 12 to 10 turns per inch. Such comparative values cannot be obtained in the completed cord unless the different materials from which the cord is made act in unison and carry their respective share of the load.

TABLE 2

|  | Rayon control (12 t.p.i.) | Rayon/nylon 60/40 (12 t.p.i.) | Rayon/nylon 60/40 (10 t.p.i.) |
|---|---|---|---|
| Strength (in. lbs.) | 3,800 | 4,200 | 4,700 |
| Durability (ml.) | 6,000 | 7,200 | 6,600 |

Within the specification the term "modulus" is understood to connote a load at a specified elongation. For example, the modulus at 3% is the load in pounds required to cause an elongation of 3%. The term "cord" is a twisted structure of two or more yarns or plies. Throughout the specification the term "yarns" can be used interchangeably with the term "ply". The term "double break" refers to a partial rupture of the cord wherein one yarn breaks substantially before the remaining yarns break.

While certain representative embodiments and details have been shown for the purpose of illustrating the invention, it will be apparent to those skilled in this art that various changes and modifications may be made therein without departing from the spirit or scope of the invention.

What is claimed is:

1. An elastomer reinforcing textile cord comprising a plurality of yarns of different physical properties that have been twisted together helically about one another with a yarn of said plurality having a higher modulus in its non-twisted state being provided with an amount of residual twist in the cord that is greater than the residual twist of another yarn of said plurality having a lower modulus so that load-at-a-predetermined-elongation of the respective yarns in the cord is substantially equal.

2. An elastomer reinforcing cord in accordance with claim 1, wherein said plurality of yarns comprises yarns of different materials.

3. An elastomer reinforcing textile cord as claimed in claim 1, wherein the said residual twist in the yarn having the said lower modulus is substantially zero.

4. A reinforcement cord for an elastomeric article comprising a plurality of continuous multi-filament yarns of different properties twisted together helically about one another with the yarn having the lowest modulus $(E_y)_{01}$ in its untwisted state being twisted to achieve a residual twist in said cord equal to zero, and a yarn having a higher modulus $(E_y)_{02}$ in its untwisted state being twisted to achieve a residual twist $n$ in said cord defined by the relationship:

$$\frac{(E_y)_{01}}{(E_y)_{02}} = e^{-c} \left[ n \left( 2.16 \frac{D_o}{\rho} \right)^{1/2} \times 10^{-3} \right]^2$$

in which $c$ varies between 2.0 and 4.0 $D_o$ being the denier and $\rho$ the density of the higher modulus yarn in its untwisted state whereby the effective moduli of the respective yarns in said cord are substantially equal as a result of the respective relative twists of the yarns in the cord.

5. The process of making an elastomer reinforcing textile cord containing a plurality of yarns of different physical properties which comprises the steps of:
  (1) twisting the yarn of lowest modulus $(E_y)_{01}$ to achieve a residual twist of zero in said cord, and
  (2) twisting a yarn having a higher modulus $(E_y)_{02}$ to achieve a number of turns per inch $n$ in said cord defined by the relation:

$$\frac{(E_y)_{01}}{(E_y)_{02}} = e^{-c} \left[ n \left( 2.16 \frac{D_o}{\rho} \right)^{1/2} \times 10^{-3} \right]^2$$

where the value of $c$ lies between 2 and 4, $D_o$ being the denier and $\rho$ the density of the higher modulus yarn in its untwisted state, and
  (3) twisting said yarns together helically about one another to form said cord.

6. A pneumatic tire having a reinforcement cord encapsulated within the elastomeric structure of the tire, said cord comprising a plurality of yarns of different physical properties twisted together helically about one another with a yarn of said plurality having a higher modulus in its non-twisted state being provided with an amount of residual twist in the cord that is greater than the residual twist of a yarn of said plurality having a lower modulus in its non-twisted state so that the load at a predetermined elongation of the respective yarns in the cord is substantially equal.

7. A pneumatic tire as claimed in claim 6, in which the number of turns of twist per inch of the yarn having the said lower modulus $(E_y)_{01}$ in its non-twisted state is substantially zero and wherein the yarn having the said higher modulus $(E_y)_{02}$ has a number of turns $n$ of residual twist per inch in accordance with the following relation:

$$\frac{(E_y)_{01}}{(E_y)_{02}} = e^{-c} \left[ n \left( 2.16 \frac{D_o}{\rho} \right)^{1/2} \times 10^{-3} \right]^2$$

in which $c$ can vary between 2.0 and 4.0 $D_o$ being the denier and $\rho$ the density of the higher modulus yarn in its untwisted state.

8. A reinforcement cord for an elastomeric article, said cord comprising a plurality of continuous multifilament yarns of different properties twisted together helically about one another with a yarn of said plurality having the higher modulus $(E_y)_{02}$ in its untwisted state having in said cord a residual twist greater by a number of twists per inch, $n$, than the residual twist in said cord of another yarn of said plurality having a lower modulus $(E_y)_{01}$ in its untwisted state, where said number of twists, $n$, is defined by the relation:

$$\frac{(E_y)_{01}}{(E_y)_{02}} = e^{-c} \left[ n \left( 2.16 \frac{D_o}{\rho} \right)^{1/2} \times 10^{-3} \right]^2$$

in which $c$ may vary between 2.0 and 4.0, $D_o$ being the denier and $\rho$ the density of the higher modulus yarn in its untwisted state.

References Cited

UNITED STATES PATENTS

| | | | |
|---|---|---|---|
| 2,273,200 | 2/1942 | Hoff | 57—140 XR |
| 2,313,058 | 3/1943 | Francis | 57—144 |
| 2,755,214 | 7/1956 | Lyons et al. | 152—359 XR |
| 2,890,567 | 6/1959 | Taylor et al. | 57—140 |
| 3,011,302 | 12/1961 | Rupprecht | 57—163 XR |
| 3,071,919 | 1/1963 | Lord | 57—144 XR |
| 3,201,930 | 8/1965 | Stirling | 57—140 XR |
| 3,233,648 | 2/1966 | Kovac et al. | 152—359 |
| 3,253,638 | 5/1966 | Kersker et al. | 152—359 |

DONALD E. WATKINS, *Primary Examiner.*

U.S. Cl. X.R.

57—140, 157

UNITED STATES PATENT OFFICE
CERTIFICATE OF CORRECTION

Patent No. 3,419,059                                                     December 31, 196

Arnold H. Bridge, Jr.

It is certified that error appears in the above identified patent and that said Letters Patent are hereby corrected as shown below:

Column 1, after line 19, insert -- The foregoing abstract is not to be taken as limiting the invention of this application, and in order to understand the full nature and extent of the technical disclosure of this applicat: reference must be made to the accompanying drawing and the following detailed description. --. Column 2, line 44, "Tan $\alpha_n = 2\pi n r_n$" should read -- $\tan \alpha_n = 2\pi n r_n$    (1) --. Column 3, lines 6 and 7, equation (2), "$A_o = \frac{D_o}{p}$" should read -- $A_o = k \frac{D_o}{p}$ --. Column 5, line 18, "event" should read -- even Column 7, line 21 and column 8, line 7, each occurrence, between "4.0" and "$D_o$" insert a comma.

Signed and sealed this 17th day of March 1970.

(SEAL)
Attest:

EDWARD M. FLETCHER, JR.
Attesting Officer

WILLIAM E. SCHUYLER, J
Commissioner of Patent